Jan. 8, 1952   J. J. NEFF   2,581,495
ELECTRONIC BORE GAUGE

Filed Aug. 18, 1945   2 SHEETS—SHEET 1

Inventor
JOSEPH J. NEFF
By
Frank H. Harrison
ATTORNEY

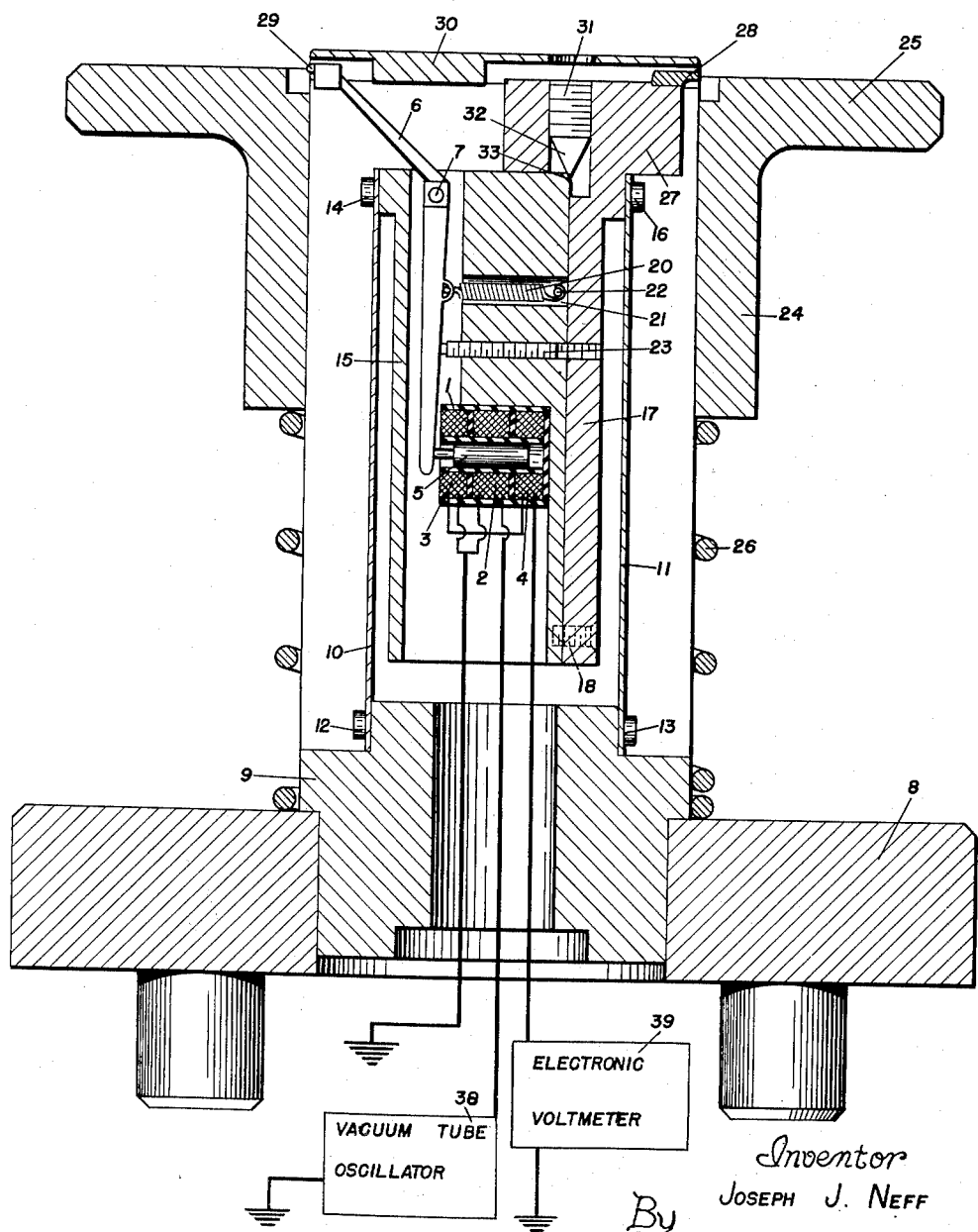

Patented Jan. 8, 1952

2,581,495

UNITED STATES PATENT OFFICE 2,581,495

ELECTRONIC BORE GAUGE

Joseph J. Neff, South Euclid, Ohio, assignor, by mesne assignments, to Jack & Heintz Precision Industries, Inc., Cleveland, Ohio, a corporation of Delaware Application August 18, 1945, Serial No. 611,314

2 Claims. (Cl. 33—178)

This invention relates to measuring instruments and has for one of its primary objects to provide an electronic gauge that will be capable of precision measurement of the diameter and concentricity, throughout a given longitudinal distance, of the bore of a piece of work.

Another object is to provide an improved work support containing an electrical displacement pickup unit and a positioning element and stylus with resilient means permitting longitudinal movement of the work over the positioning element and stylus and other resilient means that will permit radial floating to compensate for inadvertent radial thrusts imposed by manual handling of the work on the gauge to eliminate error that would be otherwise introduced.

Figure 2:
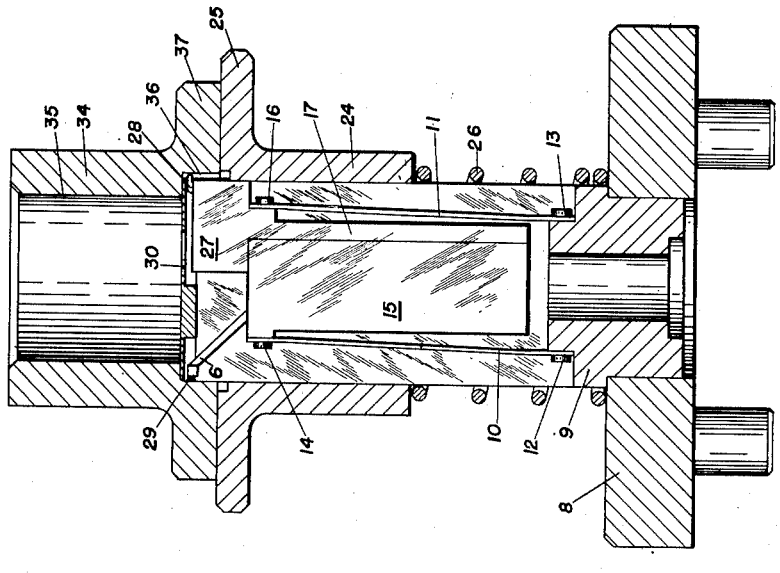
Figure 1:
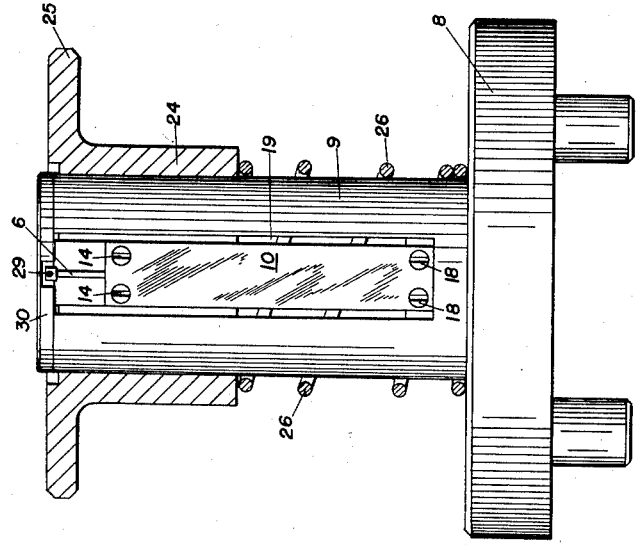

With the foregoing and other objects in view the invention resides in the combination of parts and in the details of construction set forth in the following description and appended claims, certain embodiments thereof being illustrated in the accompanying drawings in which:

Figure 1 is a view in elevation of the measuring device, without the work, showing the work support in vertical section;

Figure 2 is a view showing the work and support in vertical section and the remainder of the instrument in elevation with the displacement pickup unit tilted slightly on its floating resilient support; and Figure 3 is a view in vertical section taken at right angles to Figure 1 showing the measuring device, without the work showing the displacement pickup mechanism and diagrammatically the oscillator and electronic voltmeter circuits.

Referring more particularly to the drawings, the displacement pickup unit and the oscillator and voltmeter circuits may be of the same type as shown in the United States patent to Joseph J. Neff, No. 2,361,788, dated October 31, 1944, for Displacement Pickup and the United States patent to Joseph J. Neff, No. 2,397,196, dated March 26, 1946, for Measuring Instrument. As shown in Figure 3, it may include a coil form 1 for supporting a driving coil 2 and a pickup coil 3 on one side and a pickup coil 4 on the other side of the driving coil. An armature 5 is carried by a stylus arm 6 pivoted at 7 to move the armature longitudinally in either direction.

The instrument comprises a base 8 and hollow cylinder 9 to which latter a pair of opposed vertical leaf springs 10 and 11 are secured at 12 and 13. The top end of leaf spring 10 is connected by bolts 14 to a gauge head housing 15 and the top end of leaf spring 11 is connected by bolts 16 to a vertical member 17 which is secured near its bottom by a pair of bolts 18 to the gauge head housing 15 to support the latter in such a manner as to permit the gauge head housing 15 to be displaced about bolts 12 and 13 in either lateral direction through the vertical slot 19 extending through the cylinder 9.

The coil form 1 for the driving and pickup coils 2, 3 and 4 is suitably mounted to be housed in gauge head housing 15. As viewed in Figure 3 the stylus arm 6 is spring urged counterclockwise about its pivot 7 in the gauge head housing 15 by a tension spring 20 connected to the stylus arm below its pivot and extending through a transverse hole 21 to be anchored at its other end at 22. An adjustable abutment screw bolt 23 may also be provided to abut and limit the extent of counterclockwise movement of the stylus arm 6.

Loosely arranged about cylinder 9 is a sleeve 24 with a circular flange 25. This sleeve 24 rests on a compression coil spring 26 whose other end rests on base 8. Member 17 has an enlarged portion 27 that has a rigid stylus member 28 that is disposed 180° from the ball 29 of the pivoted stylus 6. Suitably secured to cylinder 9 is a top circular cover plate 30 of greater outside diameter than the inside diameter of sleeve 24. Extending through the cover plate and into member 27 is a set screw 31 having a conical tip 32 to engage a bevel edge 33 of cylinder 15 to pry the cylinder 15 and member 17 apart for transverse adjustment between the normal parallel relationship between members 15 and 17 about bolts 18 as a pivot for consequent radial adjustment of the rigid stylus member 28.

The work to be measured is shown at 34 having a small bore 35 and a larger lower bore 36 and having a flange 37 resting on the work supporting flange 25. The outside diameter of the top cover plate 30 is only slightly less than the inner diameter of bore 36 but considerably greater than the inner diameter of bore 35. The desired measurement is that of bore 36 throughout its length to determine its inner diameter and concentricity. Pressure is exerted downwardly on the work 34 which forces sleeve 24 downwardly against the action of spring 26. This brings the rigid stylus member 28 and the diametrically opposed movable stylus ball 29 into engagement with the inner surface of bore 36, as shown in Figure 2. Vertical movement of the work will, through the displacement pickup unit, oscillator and electronic voltmeter, indicate the diameter of the bore throughout its length and the existence of any longitudinal taper in the bore by means of the movement of the stylus arm moving the armature inside of the driving and pickup coils. Movement of the work circularly 180° not only measures the diameter of the bore but also is concentricity.

If it were not for the provision of the leaf springs 10 and 11, and the floating mount that they provide for members 15 and 17 through slot 19 about bolts 18 as a pivot in either direction, a lateral shift of the work 34 to the right on flange 25, as is shown in Figure 2, would cause a certain pressure on the movable stylus ball 29 in that direction and render the bore measurement indication erroneous. This, however, is compensated for by the two leaf springs which are disposed in the vertical planes of the movable stylus ball 29 and the rigid stylus member 28. The leaf springs resiliently oppose this transverse movement of the work but permit a floating of the members 15 and 17 about bolts 18 as a pivot. This causes the rigid stylus member 28 to be hard against the inner surface of the bore 36 at all times and hence the movable stylus ball 29 is at all times properly engaging the bore regardless of small misalignments of the axis of the bore with that of sleeve 24.

As is the case in the previously mentioned patent and application, measurement by the instrument is dependent upon the position of armature 5 within coils 2, 3 and 4. When the driving coil 2 receives a signal from the oscillator 38, opposing induced voltages are set up in pickup coils 3 and 4. When armature 5 is in the electrical center of the three coils the opposing induced voltages in pickup coils 3 and 4 exactly counter balance each other and no indication will be given by the voltmeter 39. However, if by the engagement of the movable stylus ball 29 with the bore 36 the stylus arm 6 is caused to pivot in a clockwise direction the armature 5 is accordingly displaced from its electrical center. More voltage will be induced in one pickup coil than in the other resulting in a corresponding reading on the dial of the electronic voltmeter.

The adjustment set screw 31 is accessible either with or without the work in place and is for relatively minute adjustment of the bore engaging rigid stylus member 28.

I claim:

1. In an electrical measuring instrument for measuring the inside diameter of the bore of a piece of work as to its concentricity and longitudinal taper, a housing, a base and a pair of longitudinally extending parallel leaf springs each having one end connected to said base, a displacement pickup unit supported by said housing and including a pair of pickup coils and an armature, a stylus for carrying said armature for linear movement within said coils, said housing for said pickup unit being connected to the other ends of said leaf springs to be supported thereby in spaced relationship with said base, said leaf springs being adapted to oppose movements of said housing, work supporting means, means for resiliently supporting said work supporting means slidably about said housing for longitudinal movement relative thereto, a work engaging member on said stylus adjacent one of said leaf springs, a rigid work engaging member on said housing diametrically opposite the work engaging member on said stylus and adjacent the other leaf spring.

2. In an electrical measuring instrument for measuring the inside diameter of the bore of a piece of work as to its concentricity and longitudinal taper, a housing, a base and a pair of longitudinally extending parallel leaf springs each having one end connected to said base, a displacement pickup unit supported by said housing and including a pair of pickup coils and an armature, a stylus for carrying said armature for linear movement within said coils, said housing for said pickup unit being connected to the other ends of said leaf springs to be supported thereby in spaced relation with said base, said leaf springs being adapted to resiliently oppose movements of said housing, work supporting means, means for resiliently supporting said work supporting means slidably about said housing for movement relative thereto, work engaging member on said stylus adjacent one of said leaf springs, a rigid work engaging member on said housing diametrically opposite the work engaging member on said stylus and adjacent the other leaf spring and adjustment means on said housing for selectively adjusting said rigid work engaging member radially with respect to the bore of the work.

JOSEPH J. NEFF.

REFERENCES CITED

The following references are of record in the file of this patent:

UNITED STATES PATENTS

| Number | Name | Date |
|---|---|---|
| 1,206,202 | Bright | Nov. 28, 1916 |
| 1,472,195 | Schlakpitz | Oct. 30, 1923 |
| 2,065,951 | Terry | Dec. 29, 1936 |
| 2,200,885 | Johnson | May 14, 1940 |
| 2,361,788 | Neff | Oct. 31, 1944 |
| 2,378,334 | Sirvent | June 12, 1945 |
| 2,397,196 | Neff | Mar. 26, 1946 |
| 2,411,292 | Rappl | Nov. 19, 1946 |
| 2,427,152 | Moore | Sept. 9, 1947 |
| 2,432,384 | Cornell | Dec. 9, 1947 |
| 2,439,595 | Cooke | Apr. 13, 1948 |
| 2,454,159 | Graves | Nov. 16, 1948 |

FOREIGN PATENTS

| Number | Country | Date |
|---|---|---|
| 519,551 | Great Britain | Mar. 29, 1940 |